United States Patent [19]

Lomet et al.

[11] Patent Number: 5,440,732
[45] Date of Patent: Aug. 8, 1995

[54] KEY-RANGE LOCKING WITH INDEX TREES

[75] Inventors: David B. Lomet, Westford, Mass.; Russell J. Green, Edinburgh, Scotland

[73] Assignee: Digital Equipment Corp., Pat. Law Gr., Maynard, Mass.

[21] Appl. No.: 14,181

[22] Filed: Feb. 5, 1993

[51] Int. Cl.⁶ ............................................. G06F 15/40
[52] U.S. Cl. ................... 395/600; 364/246.8; 364/246.3; 364/246.4; 364/282.1; 364/282.3; 364/283.2; 364/DIG. 1
[58] Field of Search ................... 364/DIG. 1, DIG. 2; 395/600, 400, 425

[56] References Cited

U.S. PATENT DOCUMENTS

| | | | |
|---|---|---|---|
| 4,468,728 | 8/1984 | Wang | 364/DIG. 1 |
| 4,677,550 | 6/1987 | Ferguson | 364/300 |
| 4,774,657 | 9/1988 | Anderson et al. | 364/DIG. 1 |
| 4,914,596 | 4/1990 | Levine et al. | 364/200 |
| 5,010,478 | 4/1991 | Deran | 364/DIG. 1 |
| 5,058,002 | 10/1991 | Nakamura et al. | 364/200 |
| 5,089,952 | 2/1992 | Bozman | 395/725 |
| 5,119,490 | 6/1992 | Kurose | 395/600 |
| 5,123,104 | 6/1992 | Levine et al. | 395/600 |
| 5,237,678 | 8/1993 | Kuechler et al. | 395/600 |

OTHER PUBLICATIONS

Litwin, Witold, and Lomet, David B., "The Bounded Disorder Access Method," *IEEE Computer Society Press*, 1986, pp. 38-48.

Lomet, David B., "A Simple Bounded Disorder File Organization with Good Performance," *ACM Transactions on Database Systems*, vol. 13, No. 4, Dec. 1988, pp. 525-551.

Mohan, C., "ARIES/KVL: A Key-Value Locking Method for Concurrency Control of Multiaction Transactions Operating on B-Tree Indexes," *Proc. Very Large Databases Conference*, Brisbane, Australia, Aug. 1990.

Mohan, C. and Levine, F., "ARIES/IM: An Efficient and High Concurrency Index Management Method Using Write-Ahead Logging," *IBM Research Report RJ 6846*, Aug. 1989, Almaden Research Center, San Jose, Calif.

Gray, J. N., Lorie, R. A., Putzulo, G. R., and Traiger, I. L., "Granularity of Locks and Degrees of Consistency in a Shared Data Base," *IFIP Working Conference on Modeling of Data Base Management Systems*, 1976, 1–29.

*Primary Examiner*—Thomas G. Black
*Assistant Examiner*—Maria N. Von Buhr
*Attorney, Agent, or Firm*—A. Sidney Johnston; Joseph H. Born

[57] ABSTRACT

A database-management system (10) generates bounded-disorder indexes on its database keys. In such an index, the leaf nodes (51, 62) are large and are divided into a number of buckets (52, 54, 56, 58), only one of which ordinarily is accessed in any given single-record database operation. The key values in a leaf node are distributed among the leaf node's buckets in accordance with a hashing function. The lockable ranges locked for scanning functions are defined in accordance with key-valued locking, in which each lockable range is bounded by successive key values that exist in the database. But the multiple-bucket accesses that would otherwise be required, because of the hash-function distribution of key values among a node's several buckets, are avoided because the lockable ranges are defined by the sequence of key values in the bucket rather than in the node. In addition to the existing key values, moreover, the buckets' key-value limits are also employed to bound lockable ranges, even if no database records contain those key-value limits. This prevents end-of-bucket insertions and deletions from needing further I/O operations in order to identify the lockable ranges that those insertions and deletions modify.

9 Claims, 4 Drawing Sheets

| OPERATION | RANGE LOCK | KEY LOCK |
|---|---|---|
| READ SINGLE | NONE IMPLICIT IS | S |
| UPDATE SINGLE | IX | X |
| READ SCAN | S | NONE REQUIRED |
| UPDATE SCAN | SIX | NONE FOR READ X FOR UPDATE |
| INSERT | IX | X |
| DELETE | IX | X |

FIG. 3

| TRANSACTION | INC = 39,547 | INC = 41,290 | INC RANGE 30K-50K | INC RANGE 50K-70K | COMMIT |
|---|---|---|---|---|---|
| $T_1$ |  |  | S | S | ✓ |
| $T_2$ |  |  | S |  | ✓ |
| $T_3$ | S |  | IS |  |  |
| $T_4$ |  | X | IX |  |  |

FIG. 4

| LOCK MODE | IS | IX | S | SIX | X |
|---|---|---|---|---|---|
| IS | X | X | X | X |  |
| IX | X | X |  |  |  |
| S | X |  | X |  |  |
| SIX | X |  |  |  |  |
| X |  |  |  |  |  |

FIG. 5

| OPERATION | CURRENT KEY | NEXT KEY |
|---|---|---|
| READ SINGLE | S | |
| UPDATE SINGLE | X | |
| READ SCAN | S | |
| UPDATE SCAN | X | |
| INSERT | IX<br>X IF NEXT KEY IS LOCKED WITH S, SIX, X | IX (INSTANT) |
| DELETE | X (INSTANT) | X |

| BUCKETS: | PRIMARY$_1$ | ... | PRIMARY$_i$ | ... | OVERFLOW |
|---|---|---|---|---|---|
| CONTENTS: | | | $K_1, K_2, \cdots K_j$ | | $PB_i: K_{j+1}, K_{j+2} \cdots$ |

KEY-RANGE LOCKING WITH INDEX TREES

BACKGROUND OF THE INVENTION

The present invention is directed to resource-management systems and in particular to the locking strategies that they employ.

A resource-management system is typically implemented in a computer, including its various types of storage apparatus, programmed with appropriate software. One type of resource-management system, namely, a database-management system ("DBMS") can be thought of as operating in two phases, the first of which may be called a design phase and the second of which may be called an execution phase.

FIG. 1 represents the design phase. In this phase, the DBMS 10 provides a database designer with ways of defining the "structure" of the data, i.e., the manner in which its storage is organized, and of defining transactions in which the data thus stored will be accessed by end users.

The first function, performed in what we can call a "metadata manager" 12, typically responds to structure-defining (data-definition) commands entered by the designer in a high-level database language such as SQL. A relational DBMS, for instance, may accept a data-definition instruction of the following form:

CREATE TABLE INCOME
NAME CHAR (20),
INC DECIMAL (10,2)
SSN CHAR (9);

Such a statement may establish that the database will include a relation, or table, called "income," in which each tuple, or record, includes three attributes, or fields, including a "NAME" field in the form of twenty characters, an "INC" (income) field of ten decimal digits with a decimal point two places from the right, and an "SSN" (social security number) field in the form of nine characters.

The database designer may use similar statements to define other tables that the database will include. He may further define one or more indexes, whose maintenance he knows will be valuable in the use of the database. For instance, he may employ a command such as:

CREATE INDEX ON INCOME (INC);

to create an index of the records ordered by the values of the respective records' income fields.

The result of such commands is to cause entries reflecting them in a database catalog 14 that the DBMS creates and maintains for use in its access operations. Note that none of the foregoing activities provides actual database contents; attributes have been named, but no values of those attributes have necessarily been entered.

We will assume for present purposes that it is the end users who supply the database contents by various manipulating transactions. However, it is the database designer who defines the types of transaction routines that the end users invoke for this purpose. (Actually, a separate application programmer may perform this task. From here on, we will refer collectively to the various personnel, other than the end users, who operate on the database as the "definer.") That is, the definer generates transaction routines, which the DBMS's run-time system will perform in response to requests from the end user. To produce these routines, the definer employs a group of DBMS modules to which we will refer as a "query compiler" 16.

The definer may write the transaction definition in a general-purpose language such as PL/1, but he will typically embed in the PL/1 program instructions written in the high-level database language, such as SQL, to which the DBMS responds. This can be done in PL/1, for instance, by preceding, say, SQL commands with "EXEC SQL," which is a signal that the overall PL/1 source code will have to be submitted to a precompiler before PL/1 compilation so as to strip out the SQL statements and replace them with appropriate subroutine calls. The stripped-out SQL statements would be presented to the query compiler, which would compile them into instructions that call upon the services of various operative modules within the DBMS's run-time supervisor.

A transaction-defining statement in the high-level database language may be in the form:

START TRANSACTION
SELECT INC
FROM INCOME
WHERE SSN=123456789"
COMMIT WORK;

When the routine specified by such a statement runs, it searches the database for a record in which the SSN (Social Security Number) field is 123 45 6789 and fetches the value in the income field of that record.

To compile this command, the query compiler 16 consults the database catalog, which contains the implementer's definitions of the data organization, such as that "INCOME" is a relation and INC and SSN are two of its attributes. It also determines the best manner in which to search for the indicated information, and it employs the index information in order to do this. If, for instance, the definer has required that an index ordered by social-security number be provided, then the query compiler produces a transaction routine that accesses the record by way of that index. In such a situation, the SSN attribute is the "key" by which the system finds the desired record (or records).

It should be emphasized at this point that, although we depict the query compiler as operating in the design phase rather than in the execution phase, many of what will be described below as features of the query compiler are only implicit in most DBMS implementations until the execution phase is in progress. In particular, the typical query compiler places in the transaction routine 17 calls to operation subroutines chosen from a subroutine set resident only during the execution phase and commonly called by most transaction routines. Since the contents of these subroutines are all part of the translation from transaction definition to implementation instructions, we consider them features of the query compiler, and the remaining discussion will not distinguish between the functions that the query compiler performs directly during the design phase and those that its design-phase actions perform only indirectly, by incorporating calls to existing subroutines resident during the execution phase.

Among the capabilities of many DBMSs is that of maintaining what is known as "serializability." In writing transaction definitions, the database definer is defining what will happen when an end user submits a request to the system. One resulting transaction routine, for instance, might be invoked by a user at an automatic teller machine to transfer money from one account to another. Another might be invoked by a bank executive from a management-information-system terminal to request the total of all account balances for a given branch of the bank. In each case, the end user submits his transaction request to a run-time supervisor 18 (FIG. 2), which calls the specified transaction routine. The transaction routine obtains records from a storage medium 19, such as a magnetic disk or cached copies of its contents, through the operation of a buffer manager 20. The actual central-processor time involved in each of these transactions may be very small, but the time required between the beginning and end of the transaction may be considerable, since time is usually required to await data from storage facilities, inputs from the human user, etc. In the operation of most large databases, it is therefore important that the central processor be freed to perform operations of other transactions between the individual operations of any single transaction. But this interleaving can cause problems if steps are not taken to prevent them.

For example, the ATM user's transfer of money from one account to another may actually be implemented in a number of operations, which may be interspersed with inputs from the user. The transfer involves the separate steps of removing money from one account and adding it to another. Similarly, the bank executive's transaction of obtaining account totals may include a number of separate operations, each of which involves reading an account balance and adding it to a running total. If these operations are interleaved, the account-totaling operation may copy the balance from the ATM user's first account before the transfer and from the second account after the transfer, and this would indicate to the executive that the bank total is greater than it actually is.

This would not result, of course, if the two transactions occurred serially. One of the functions of most DBMSs is therefore to perform transactions in such a way that concurrently performed sets of them are serializable, i.e., that their results are the same as that of a series of nonconcurrent transactions, without requiring actual serial transaction ordering. To this end, the query compiler usually causes the transaction routine to include certain operations that invoke the services of a DBMS module known as a "lock manager" 21, which is active in the execution phase depicted in FIG. 2 (and actually in the design phase, too, for purposes not relevant here) and maintains a lock table 22, whose contents indicate which "resources" are currently involved in transactions in such a manner that certain operations on them by other transactions must be postponed until the previous transactions have been completed. That is, if a transaction performed by such a routine includes an access to a certain resource, it will also request that the lock manager post a lock in the lock table identifying the designated resource as one to which access is restricted. (We use the more-general term resources instead of records for reasons that will become apparent. Until those reasons do become apparent, however, little harm results from reading "records" for "resources.")

When an end user invokes a transaction routine during this execution phase, that routine will request that the lock manager post a lock on the required resource, and the lock manager will return to the routine an indication of whether such a lock is permitted. If not—because another transaction has already locked that resource—the transaction that has requested the lock will be at least temporarily prevented from proceeding. Otherwise, (except in certain "instant lock" cases that will be described below) the lock manager will enter a lock in the lock table and thereby restrict other transactions' access to the locked resource.

Of particular interest in the present context is what is known as "range locking." The serializability of some types of transactions is not assured by simply locking the several records to which they require access. An example of such a transaction is one that includes a scan operation, which accesses all records in which a certain attribute's values are within a specified range.

For instance, one transaction may be to find the total income within an income range. A concurrent transaction may be to insert records for a group of new taxpayers who first have reportable income within a given period. It is desirable that the computed total reflect either all or none of the new taxpayers, but individual record locking does not insure this result. If the insertion transaction inserts one record in a part of the range that the total transaction has already searched and another in a part that it has not, then neither transaction will encounter the other's locks, and the total-computing transaction's result will be erroneous. This is because of the "phantom" records that were inserted into a range after that range's original occupants were locked.

To remedy this problem, database management systems must lock entities other than just records. For example, a DBMS may lock a whole file when a scan operation is performed in it. But such an expedient can produce a considerable reduction in the system's achievable concurrency, i.e., in the degree to which operations of separate transactions can be interleaved. Alternatively, therefore, DBMSs sometimes employ range locking, which treats not only individual key values but also key-value ranges as resources to be listed in the lock table. Therefore, when a transaction routine includes an operation directed to all records within a certain target key range, it causes the lock manager to post locks directed not only to the individual key values to which the transaction will obtain access but also to a set of lockable ranges that covers the target range. And, if another operation is directed to a specific key value, that transaction not only requests a lock on that key value but also has the lock manager check for locks on any lockable range into which that key value falls. This latter function is performed by additionally identifying any such range resource and requesting a lock on it.

The routine for inserting records of new taxpayers, for instance, would identify all ranges into which the records that it intends to insert fall, and it would check the lock manager to determine whether there are locks on these ranges. Since the total-computing transaction will have acquired locks on ranges into which the new taxpayer records would otherwise have been inserted, the record-insertion transaction is postponed until the total-computation transaction has been completed, and serializability is thereby maintained.

We digress at this point to note that locking a key value or range thereof is not the same as locking the record or records that the key value or range designates. In requesting a lock at the beginning of a search by key value, the operation passes to the lock manager a "resource ID," which is typically a hashed or otherwise encoded version of the key value. It is this ID against which the lock manager posts a lock and for which it searches to determine whether the lock can be granted. Now, the record identified by the name-attribute value John Doe may be the same as that identified by the social-security-number-attribute value 123 45 6789. But the key-value locking performed by an operation that uses John Doe as its key value and uses (typically a hashed or otherwise encoded version of) that value as the resource identifier when it acquires a lock on that name does not by itself restrict access to that record by an operation that requests a lock on the social security number. Typically, of course, the operation will also perform further locking, such as record-ID locking, which will cause access to that record from other paths to be restricted. Indeed, one of the keys may in essence be the record ID. But we are not concerned with that here. Here we are concerned only with locking on the basis of a given key or range thereof, so we will refer to key-value or range locking, which may or may not be accompanied by or equivalent to record locking.

Although it is better than locking the whole file, locking ranges of key values can itself reduce concurrency significantly. To lessen this concurrency reduction, DBMSs employ more than one mode of lock, each lock mode differing from the others in restrictiveness. This restrictiveness variation is useful even if the DBMS does not use range locking. For example, a lock acquired by a transaction as a result of an operation that only reads records does not need to prevent other transactions from reading those same records, but a lock resulting from a write operation does. In recognition of this fact, a simple, two-mode locking system may employ lock-table entries that include an indication not only of whether a lock is in place but also of whether the lock is a share-mode ("S") lock, requested for read operations, or an exclusive-mode ("X") lock, requested by record-modifying operations. A transaction requesting an S lock will be deterred only by X locks on the target resource, not by S locks, while transactions that request X locks will be deterred by locks of both types.

Database systems that employ range locking often obtain additional concurrency by means of "multi-granularity locking," or MGL, which conventionally employs five lock modes, as FIGS. 3, 4, and 5 illustrate. FIG. 3 is a lock-mode table, which indicates the types of locks acquired by transactions in accordance with one application of the MGL scheme for the different types of database-access operations of which they may be comprised. In addition to the simple "covering" lock modes S and X, there are three "intention" lock modes, designated IS, IX, and SIX, whose purpose is to indicate, with respect to a key range, that a further, covering lock will be acquired on a key value that falls within that range. (Actually, the SIX mode, as will be seen below, is both a covering lock and an intention lock.)

FIG. 4 is an exemplary lock table that will be employed to explain intention locking. In the example, we will assume that one of the attributes in a relation defined for a given database is labeled "INC," for "income." That is, if the relation is thought of as a table, each row of the table represents a taxpayer, and one of the columns represents those taxpayers' incomes. Let us further assume that the database designer has required (not necessarily in principle but nearly unavoidably in practice) that an index be maintained of incomes and that he has further specified that the DBMS is to treat certain predetermined ranges of incomes as lockable resources. The reason for this may be that a purpose of the database is to support studies of characteristics of various predetermined income ranges.

Now, suppose that a user calls for performance of a transaction routine for totalling all incomes within the $40,000–$60,000 income range and that the database designer has specified two predetermined ranges of $30,000 to $50,000 and $50,000 to $70,000. The DBMS's run-time supervisor responds to this request by running the requested transaction routine and assigning this instance of that routine's operation the transaction name $T_1$. Since transaction $T_1$ will need to read all records within the two ranges but not to update any of them, it requests S locks on the two ranges, as the first row of the FIG. 4 table indicates. The S lock is a covering lock, since it implicitly locks each key value in the range. But the transaction does not explicitly place a separate lock on each key value—i.e., each income level—that it finds, since the query compiler will have so designed any transaction routine that similarly searches for records by income as to cause the lock manager to check the income range into which the indicated income falls.

The "read scan" entry in the FIG. 3 mode table reflects this lock-mode selection. It shows that, upon a scan-type read operation, i.e., one which requests all records within a given range, a lock of the S type is acquired on the range or ranges involved but not on the individual key values.

As FIG. 5 indicates, lock mode S is compatible with only two lock modes, IS and S. The latter compatibility is exemplified by a concurrent transaction ("$T_2$"). Transaction $T_2$ requires access to the S-locked ranges, but only to read them, so it requests S-mode locks of those ranges. The lock manager, which implements the compatibility table of FIG. 5, informs $T_2$ that the requested lock mode is compatible with the existing (S-mode) locks on those ranges in its lock table. It therefore posts the lock, as the FIG. 4 lock table indicates in the $T_2$ row.

To observe compatibility of the S mode with the IS mode, let us consider a transaction ("$T_3$") whose purpose is to fetch, say, the identity of the taxpayer whose income is $39,547. This involves a "singleton read" operation, i.e., one that targets an individual key value, not a range, although the key value may fall within a range. As FIG. 3 indicates, the query compiler requires such an operation's transaction to request not only an S lock on the actual key value to which this operation is directed but also an IS lock on any range in which that key values falls. Accordingly, as FIG. 1 shows, $T_3$ acquires an S lock on income value $39,547 and an IS lock on income range $30,000 to $50,000. The lock manager grants this lock, even though locks have already been acquired on that income range, because the lock manager's compatibility matrix (FIG. 5) indicates compatibility between the IS and S locks.

The IS lock is not a covering lock: the operation that caused it is not directed to the range against which the IS lock is posted. Instead, it is an intention lock: it indicates the intention to acquire a lock on a different resource, namely, a key value, that the range includes (or, for some resources, otherwise overlaps). Its purpose is to prevent another transaction from acquiring a covering lock on the range that would be inconsistent with the first transaction's access to the included (or overlapped) resource.

The difference between the IS and S locks becomes apparent when one considers a new transaction $T_4$, whose purpose is to correct the income value for the taxpayer whose income is $41,290. This is a "singleton update," and FIG. 3 indicates that the involved range and key value must be locked in modes IX and X, respectively. FIG. 4 shows that no previous transaction has obtained a lock on the key value of $41,290. But that value falls within the $30,000 to $50,000 range, on which previous transactions have already acquired locks, and the mode, S, of two of those locks is incompatible with the IX-mode lock that transaction $T_4$ requests on that range. Transaction $T_4$ therefore cannot proceed until the S-lock-holding transactions $T_1$ and $T_2$ have ended, either by aborting or by running to completion, i.e., in database parlance, by "committing."

Now, let us suppose that transactions $T_1$ and $T_2$ commit. A committing transaction notifies the lock manager, which responds by removing the transaction's entries. FIG. 4 uses check marks to represent such removals for transactions $T_1$ and $T_2$. The only lock remaining on the $30,000 to $50,000 range after transactions $T_1$ and $T_2$ commit is therefore the IS-mode lock acquired by transaction $T_3$. Remember that transaction $T_3$ requested only an IS-mode lock on the range, since it did not need to read all of the range but only needed to indicate that it would be reading something within the range. Thus, as FIG. 3 indicates, the IS mode is compatible with the IX mode requested by transaction $T_4$ on the $30,000 to $50,000 range. After transactions $T_1$ and $T_2$ have committed, therefore, transaction $T_4$ can acquire the locks that it requires before it will proceed.

It can be appreciated that range locking of this type eliminates the phantom problem yet affords considerable concurrency. As the last example indicates, however, the use of such definer-specified ranges is somewhat inflexible. Specifically, the target income range mentioned above did not fit the predetermined ranges very closely, and locking enough predetermined ranges to cover the target range resulted in less concurrency than would have been possible if there had been a closer fit. Additionally, the approach to MGL just described requires considerable locking overhead, since it requires that two resources, namely, a key range and an individual key value, be separately locked for most operations.

A system that deals with these problems is the ARIES/KVL system described in Mohan, "ARIES/KVL: A Key-Value Locking Method for Concurrency Control of Multiaction Transactions Operating on B-Tree Indexes," *Proc. Very Large Databases Conference*, Brisbane, Australia (August 1990). This system dynamically re-defines key-value ranges in accordance with the current population of key values. Specifically, the system maintains a key-value-ordered index, and the possible lockable ranges are the ranges between each pair of successive key values that currently exist in the index. That is, if the existing key values are $k_1, k_2, \ldots, k_i, \ldots$ such that $k_i < k_{i+1}$, then the ranges are the disjoint semi-open intervals $(k_i, k_{i+1}]$, and each such range is identified by the upper bounding key value. Equivalently, of course, the range could be identified instead by the lower attribute value, in which case the range would be open at the top rather than at the bottom. Since locking granularity is finer if the ranges are disjoint, it is preferable for one end of the interval to be open. A single lock-request resource identifier in this system identifies both a key value and the range that the key value bounds. This enables a transaction to lock with a single lock request both a range and the key value that bounds it.

FIG. 6 lists the lock modes required in the ARIES/KVL system for the various operations that a transaction might include. Unlike FIG. 3, FIG. 6 includes only one column for the first four operations listed, because an ARIES/KVL operation does not separately lock key values and key ranges. Of particular interest in the present context, however, is that FIG. 6 does include a second column for insert and delete operations. This does not indicate that key values and ranges are locked separately for these operations. Instead, it represents a separate lock on what will be described below as the "next" key value/range. This is necessitated by the fact that inserting and deleting records in a KVL system divides or extends existing key ranges.

Suppose that a record having a key value of $k_i$ is to be deleted. Clearly, one transaction's deletion of a record that has been written, read, or inserted by a second uncommitted transaction potentially compromises the serializability of those transactions. Therefore, an operation that deletes $k_i$ should not be permitted if another transaction has any lock on $k_i$ regardless of the mode of that lock. A deleting transaction accordingly tests for any such lock by requesting an X-mode lock on $k_i$. FIG. 6 includes the "instant" notation to indicate that the transaction need only request a compatibility indication and not actually acquire the lock, for a reason that will presently become apparent.

As FIG. 6 shows, the deleting transaction requests a lock not only on the targeted key value/range but also on the "next" key value/range, i.e., on key value/range $k_{i+1}$, which includes the range previously represented by the deleted key value $k_i$. Since that range has now been modified, no access to it should be permitted, so the transaction acquires an X-mode lock on range $k_{i+1}$.

Insertions, too, require next-range locking. Let us suppose that an inserting transaction is to insert a new key value $k_i'$ between $k_i$ and $k_{i+1}$. This will reduce the width of the range previously represented by key value $k_{i+1}$, so range $k_{i+1}$ must be checked for locks. For this purpose, ARIES/KVL uses an instant lock in the IX mode if the inserting transaction has not previously locked that key/range. Clearly, if that range had been, say, scanned by another uncommitted transaction, as indicated by an S, X, or SIX lock, that range should not be modified by inserting a new record into it. Testing by means of an IX-mode lock prevents this. However, there is no reason why the $k_i'$ record cannot be inserted by one transaction just because another uncommitted transaction has previously inserted the $k_{i+1}$ record, as indicated by a previously existing IX-mode lock. Since the requested IX-mode lock is compatible with an IX-mode lock, such an insert "in front of" another insert can occur. (In front of and behind are defined by the direction in which key-valued ranges extend: a range extends in front of the key value that represents it.) The inserting transaction requests only an instant lock in this mode because there is no reason why one transaction's insertion of $k_i'$ should prevent another transaction's access to $k_{i+1}$.

This locking of the next range, although simple in principle, can be time-consuming in practice because of the need to identify the next key value, by which the next range is identified. To understand this requires consideration of the manner in which databases are indexed. The most popular type of index is the B-tree, which comprises a hierarchy of nodes, or sets of contiguously stored index (as opposed to data) records. The highest-level, or root node in a typical B-tree contains $N-1$ key values, $N>1$, sometimes called separators in this context, that divide the entire key space into N subspaces, with each of which is associated a lower-level node to which the root node contains a pointer. That is, the separators in one level's nodes represent the key-value limits of nodes in the next level down. To find a database record containing a given key value, a search routine starts at the root node and determines, by comparing the searched-for key value with the root node's separators, the subspace into which the searched-for key value falls. The search routine then follows the pointer to the associated lower-level node, which typically itself contains a set of separators that further divide the subspace, in which case it also contains pointers to still-lower-level nodes. This process continues until the search reaches a node in the lowest level of the hierarchy. Such a node is referred to as a leaf node. If the search key is a secondary key, each leaf-node record typically consists of a value of that key and the record ID of a database record that contains that key value. In the case of a primary index, the leaf-node records are typically the database records themselves.

The database and its indexes are ordinarily stored on a disk or other non-volatile memory, whose contents the host computer's operating system accesses in integral numbers of pages. The size of memory block, or bucket, by which the DBMS accesses the database is typically a single page or a number of pages small enough not to tax the bandwidth of the disk-to-buffer channel unduly, and a leaf node comprises a single bucket in a conventional B-tree. If the entire index other than the leaf nodes could be cached in main memory, a random access of a database record could be performed with a single disk access. For most large-sized databases, however, this is not practical, and the lowest two tree levels must usually remain on the disk. Accordingly, one I/O operation must be performed to reach the penultimate-level node, and a second I/O operation must be performed to reach the leaf node. (Of course, if the search key is a secondary key, a still further I/O operation must be performed to reach the database record itself.)

The B-tree organization is the most popular indexing approach, but another approach, employing a "hashed" file, yields better performance in random accesses of single records. In accordance with this approach, some function of the search key value (the hash function) is used to compute the address of the bucket in which the record resides that contains the searched-for key value. Random access to a single record thus ordinarily requires only a single I/O operation. (In practice, buckets sometimes overflow, and a second I/O operation then must be performed to obtain records that reside in overflow buckets, but this typically happens in only a small percentage of accesses.)

Although hashing yields superior performance for random accesses of single records, hash-type indexes are somewhat less popular than B-tree indexes because their performance for range searching is abysmal. Since the B-tree separators assign unique nodal key-value ranges to the leaf nodes, leaf nodes in B-trees are ordered by search-key value, but the same is not true of the hash-file buckets. In a hash file, therefore, a range search will ordinarily require accessing all buckets, while only those whose key-value ranges overlap the target range need to be searched in a B-tree.

Not surprisingly, a number of attempts have been made to achieve the fast single-record accesses of hashing methods while also obtaining the range-search performance that simple B-tree organizations provide. Some have achieved this result at the cost of a heavy dependence of file-utilization efficiency on the key-value distribution in the database. One particular method, however, described in Lomet, "A Simple-Bounded Disorder File Organization with Good Performance," *ACM Transactions on Database Systems*, vol. 13, no. 4, December 1988, pp. 525-51, yields a single-record-access performance similar to that of straight hashing methods while affording a range-search capability that, at least for reasonably wide ranges, is similar to that of a conventional B-tree.

Like some other approaches, the bounded-disorder method employs an organization that is the same as that of a conventional B-tree at the higher levels, but the leaf nodes are much larger. The leaf nodes are large enough that all of the tree levels except the leaf level can conveniently be cached in main memory. Each leaf node is too large to make it practical routinely to read the entire node for single-record accesses, but it is essentially a hash file, divided into buckets, to which access is directed from the previous tree level by a hashing function.

The search of a bounded-disorder index accordingly proceeds in a manner essentially identical to that of a conventional B-tree search until it reaches the penultimate node level. At that point, the pointer identifies a leaf node, but the leaf node is too large to be read routinely into main memory for single-record accesses. Instead, the search routine employs a hash function of the searched-for key value to locate a particular bucket within the leaf node, and it is only this bucket that is read into main memory to obtain the searched-for record.

The result of this organization is that all of the leaf nodes are ordered in key value with respect to each other, but each leaf node consists of a plurality of buckets, within which records are distributed in accordance with the hashing function so that there is no order among the buckets within a leaf node. Preferably, however, the records within a single bucket are stored in key order.

Clearly, since the entire index except for its leaf-node level can be cached in main memory, a single-record file access can ordinarily be performed in a single I/O operation. (Again, a further I/O operation may be required for a bucket that has overflowed.) Since the leaf nodes are ordered, however, ranges of key values are localized to a subset of the leaf nodes, with the result that range-searching performance approaches that of a conventional B-tree, at least for ranges that span several nodes.

A bounded-disorder file organization thus affords significant advantages, at least for a single-user database system. But one may wish to apply the bounded-disorder principle to multi-user database systems, so the question arises of how to lock ranges where such an organization is employed. A little reflection reveals that a bounded-disorder index lends itself to the type of range locking in which the lockable ranges are in a sense independent of the key-value population: the lockable ranges can be defined by the key-value limits on the leaf nodes. Accordingly, when a single record is accessed, the range on which an intention lock needs to be placed is readily identified by the index terms encountered in traversing the tree, since the index terms encountered in the penultimate-level node are the key-value limits of the leaf node and thus of the lockable range.

But the granularity of that approach is too coarse to be acceptable for many applications, so one would prefer key-value locking. Unfortunately, conventional key-value locking—in which the lockable ranges are bounded by successive key values existing in the database—has not heretofore been readily implementable with a bounded-disorder index. The reason for this is that successive key values are not in general in the same bucket, so all of the buckets in a node would need to be accessed in order to identify the "next" key-valued range implicated in a delete or insert operation.

In a scan operation, it would be acceptable to access all of the buckets in a node, since nearly as many pages would have to be accessed for a similar operation in a conventional B-tree file if the scan operation's target range is very great, as it usually is. Indeed, the bounded-disorder index may provide performance advantages: because all buckets in a node ordinarily are stored contiguously, a scan in such an index would likely encounter fewer separate sets of contiguous pages, so the I/O operations could be completed more quickly. In an insert or delete operation, however, conventional key-value ranging results in significant disadvantages for a bounded-disorder organization. A conventional B-tree usually permits the implicated range to be identified without a further I/O operation, because the next key value is usually in the same leaf node as that in which the delete or insert operation is to be performed. But a bounded-disorder index requires that all of the buckets of a large node be inspected before the implicated range can be identified. (It should be observed, however, that even B-trees require a second I/O operation to identify the implicated key-valued range if the range bridges a page boundary.)

SUMMARY OF THE INVENTION

According to one aspect of the present invention, only one bucket of a node in a bounded-disorder file ordinarily needs to be searched in order to lock a key-valued range when an insert or delete operation is performed. In accordance with this approach, the lockable ranges in a leaf node do not form a single sequence of non-overlapping ranges but instead form a number of such sequences, each of which is defined by the key values existing in only a single bucket of the leaf node. In other words, a range defined by the key values existing in one bucket of a node will ordinarily overlap ranges similarly defined by key values existing in other buckets of the same node but will not overlap ranges defined by key values in different nodes.

Since the sizes of the ranges will on the average be n times the range sizes employed in conventional key-valued locking, where n is the number of buckets per node, one might expect such an approach to have a significant adverse effect on concurrency. But it turns out that this is not the case. Although the average difference between two successive existing values $k_i$ and $k_{i+1}$, in a single bucket is in general n times that between the values that define a lockable range in conventional key-valued locking, a lock of such a range interferes on the average with single-record operations on only 1/n of the key values that fall between the bounding values. The reason why such an approach works for single-record accesses is that scan operations are required to lock ranges in all buckets. Although this requirement can result in causing a scan operation to access some pages to which access would not be required by conventional key-valued locking, the fractional increase in the number of such accesses tends to be very small, while the reduction in I/O time for a single-record access is considerable.

In accordance with another aspect of this invention, moreover, insertions and deletions can be performed in a single I/O operation even when the key value inserted or deleted is the last one in a bucket and thus would conventionally require a second I/O operation to identify the next key value. In accordance with this aspect of the invention, which is applicable not only to bounded-disorder files but also to conventional B-trees, the key value used to represent the last lockable range in the bucket is the bucket's key-value limit, which can always be determined without performing another I/O operation.

BRIEF DESCRIPTION OF THE DRAWINGS

These and further features and advantages of the present invention are described below by reference to the accompanying drawings, in which:

FIG. 3 is a lock-mode table that characterizes a type of DBMS query compiler;

FIG. 4 depicts an exemplary lock table maintained by a lock manager;

FIG. 5 is a compatibility table that characterizes certain types of lock managers;

DETAILED DESCRIPTION OF AN ILLUSTRATIVE EMBODIMENT

Figure 7:
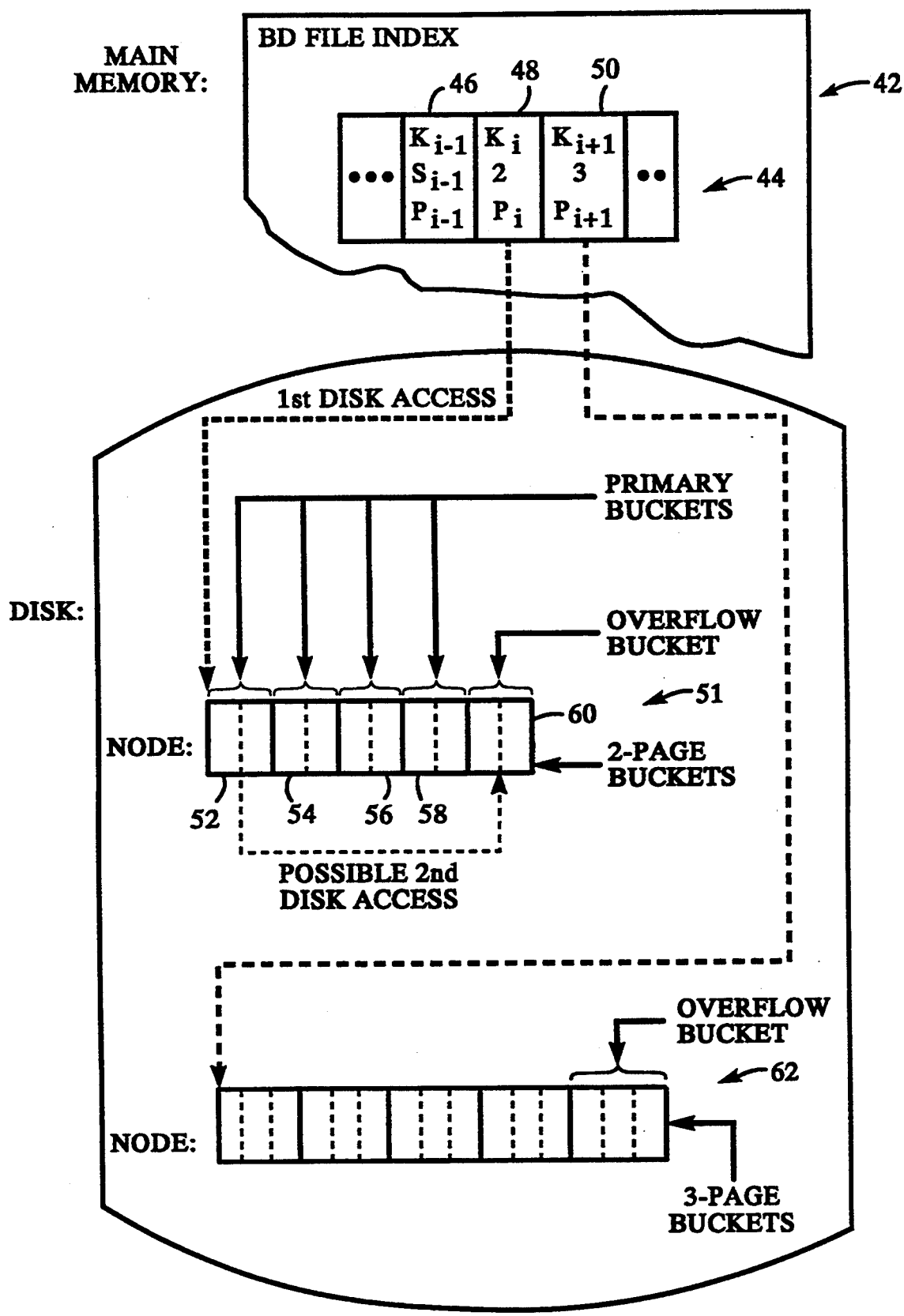
FIG. 7 is a diagram depicting the structure of a bounded-disorder index.

FIG. 7 depicts a single-record access performed in a bounded-disorder file. The main memory 42 includes the upper levels of a primary-key index, including a penultimate-level node 44, which includes, among other index records ("index terms"), terms 46, 48, and 50. For purposes of explanation, there is no loss in generality in considering the penultimate level to be the top level and node 44 to be the root node. Accordingly, let us say that a search begins by comparing the searched-for key value k with separators K in node 44.

We assume that the searched-for value k falls between $K_{i-1}$ and $K_i$. This means that the database record whose key field equals k is contained in a node 51 to which the pointer component $P_i$ of index term 48 points. In accordance with the typical bounded-disorder file organization, the leaf node that the pointer identifies is so large that reading it into main memory would take too long to be feasible for routine single-record accesses. Consequently, only a single one of the node's constituent buckets, namely, the one containing the searched-for record, is read into main memory. For the sake of simplicity, we will assume that each node contains only four "primary" buckets, designated by four possible hash values, and that it further includes a fifth, overflow bucket. If the (atypically simple and ineffective) hash function is simply the two least-significant bits of the searched-for key, for example, buckets 52, 54, 56, and 58 might correspond to values 00, 01, 10, and 11, respectively. In the illustrated embodiment, the index term 48 includes a size component S, which indicates the associated node's bucket size in pages. The result of hashing the searched-for key is multiplied by this value and the page size, and the result is added to the pointer value to find the beginning of the bucket to be read.

FIG. 7 indicates that the size $S_i$ has a value of two, so two pages beginning at that bucket address are read into main memory, and the record having the searched-for key is found. (According to this particular file organization, the bucket may have overflowed, in which case it contains an indication of that fact, and a second disk access, of a fifth, overflow bucket 60, may be necessary. Since most accesses do not require a second disk access, the average number of I/O operations per single-record access is just slightly over one.)

In the illustrated organization, the nodes have a fixed number of buckets, but the buckets are expandable; dashed lines indicate that each bucket of node 51 consists of two pages, while each one in a further node 62 consists of three pages. Those familiar with bounded-disorder file organizations will recognize that this expandable-bucket feature is not necessary: a fixed bucket size with a variable number of buckets per node is possible, as is a fixed bucket size with a fixed number of buckets per node. However, we believe that the organization depicted in FIG. 7 has certain operational advantages, which are not relevant here but which are described in the Lomet paper referenced above.

Figure 1:
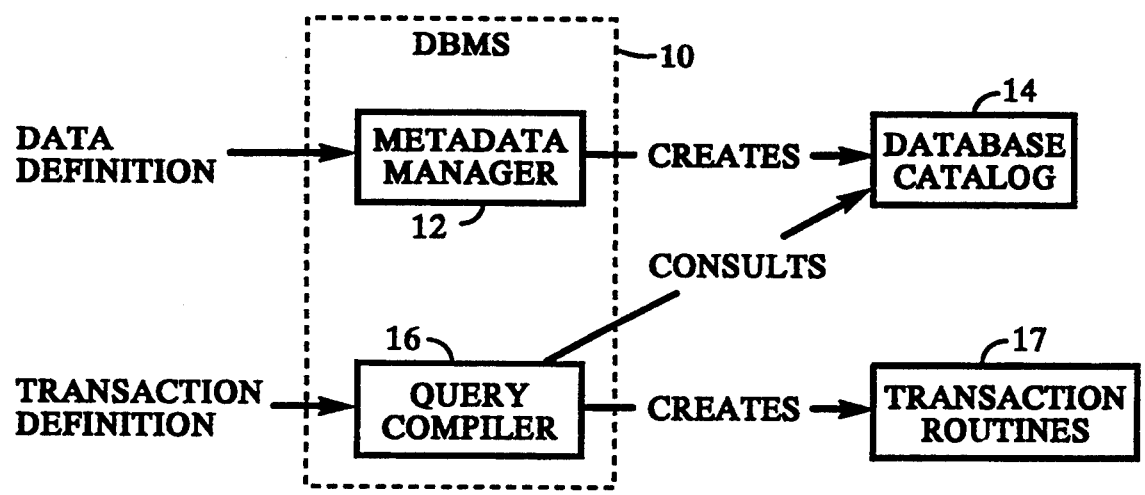
FIG. 1 a block diagram that depicts parts of a DBMS that are used by a database definer during database design.
Figure 2:
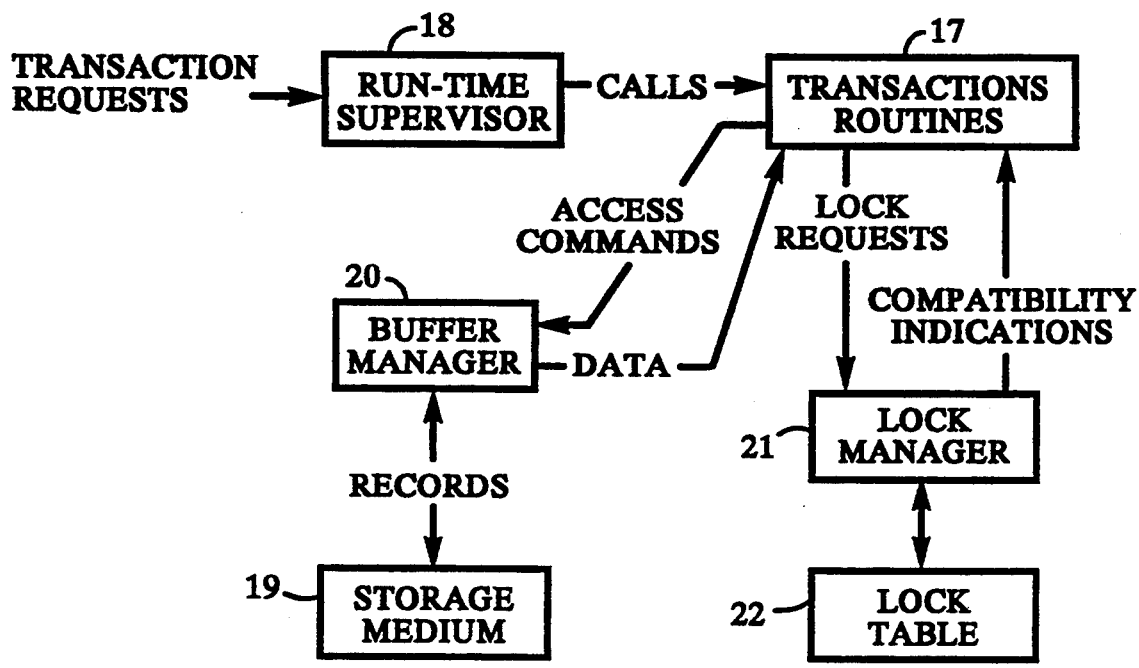
FIG. 2 is a block diagram of parts of a DBMS employed to respond to requests from an ultimate user.
Figures 6, 8, 9:
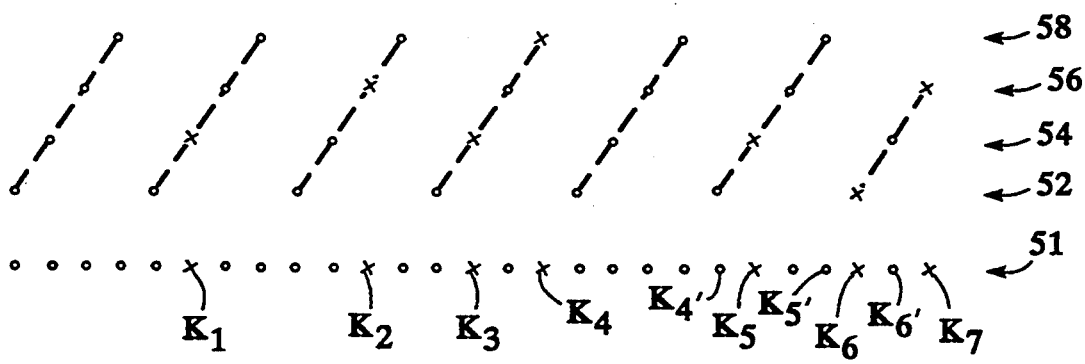
FIG. 6 is a lock-mode table that characterizes certain other types of query compilers.
FIG. 8 is a diagram of part of the population of the several buckets in a leaf node of a bounded-disorder index.
FIG. 9 is a diagram depicting the segregation of key values between a primary bucket and the overflow bucket in accordance with one embodiment of the present invention.

We now turn to the manner in which key-value locking can be practiced in such an organization. For this purpose, we consider FIG. 8, which depicts a portion of the key-value space encompassed by node 51. FIG. 8 comprises five rows of circles and Xs. The circles and Xs in the lowest row represent all possible key values in the portion of the node's key-value space that FIG. 8 represents. The Xs represent actually existing values, i.e., values contained in records currently in the database, while the circles represent other possible values.

The upper four rows represent the distribution of those possible and existing values among the four buckets, each row being referenced by the reference numeral associated with the bucket that it represents. The dashed lines in FIG. 8 represent the hashing function in accordance with which the possible key values are distributed among the buckets. Suppose, now, that the record containing existing key value $k_3$ is to be deleted. In accordance with conventional key-valued-locking practice, this would require that the deleting transaction acquire a lock on a range bounded by existing key values $k_2$ and $k_4$, which would be successive values existing in the node after key value $k_3$ is deleted. To identify this range, the transaction would be required to access not only bucket 54 but also buckets 52, 56, and 58 so as to determine which is the next existing value and thereby identify the value $k_4$, which is resident in bucket 58, that forms the upper bound of that range. After that range had been identified, the transaction would then request a lock on it.

In accordance with the present invention, however, accesses of the other buckets are not required. Instead, the insert operation merely searches bucket 54 for the next-higher key value in that bucket and requests a lock on that value, namely, key value $k_5$, which represents a range bounded by values $k_1$ and $k_5$.

Now let us suppose that a different transaction is to insert into the database a record having key value $k_4'$. To preserve serializability, a transaction cannot insert a record into a range that results from a deletion by another uncommitted transaction, so an inserting transaction must request a lock on the range represented by the next-higher existing key value and thereby determine whether the target range has been locked by a deletion. In conventional key-valued locking, this range would be the range represented by key value $k_5$, on which the other, deleting transaction has obtained a lock. Conventionally, therefore, insertion of the record having key value $k_4'$ would not be permitted until the transaction that deleted key value $k_3$ has committed. In accordance with the present invention, however, the inserting transaction does not identify the implicated range by searching for the next-higher value in the node: it searches for the next-higher value in the same bucket. Accordingly, unless a lock has been acquired by a different transaction on key value $k_6$, which is in the same bucket 52 as that into which key value $k_4'$ is to be inserted, the inserting transaction can proceed.

The cost of employing parallel sets of overlapping ranges is that scan operations must lock all sets of ranges separately. For instance, suppose that a scan operation is to read all records whose key values are between $k_2$ and $k_4$. In conventional key-valued locking systems, this would require locking two ranges. The first range, represented by key value $k_3$, would extend from that value down to key value $k_2$. The other, represented by key value $k_4$, would extend from that value to key value $k_3$. In a conventional, single-bucket-mode B-tree organization, these key values would be in the same bucket in most cases, so no extra I/O operations would be required to identify the ranges to be locked. Moreover, the total range thereby locked is, as was just described, only that between key values $k_2$ and $k_4$. In contrast, the present invention requires that all buckets in the node be accessed and that locks be acquired on the ranges represented by key values $k_3$, $k_4$, $k_6$, and $k_7$. The values thereby locked would include some as high as $k_7$ and some below $k_1$.

The foregoing example was chosen to emphasize the difference between conventional scanning and scanning in accordance with the present invention, and it appears to suggest that the method of the present invention requires considerably more access time for scan operations than the conventional B-tree organization does. But this is true only for very small ranges. Scans are normally performed on ranges that span many buckets, and the total cost in I/O time for such scans is low on a percentage basis.

We now turn to another aspect of the present invention. Although the benefits of this aspect of the invention are particularly pronounced for bounded-disorder indexes, it is also applicable to other systems that employ key-valued locking.

In the preceding comparisons with conventional key-valued locking, it was noted that finding the next key value, which is necessary in order to perform proper locking for insert and delete operations, can require an additional I/O operation even for conventional B-tree indexes in some circumstances. In particular, a second I/O operation is required by a delete operation to be performed on, and by an insert operation to be performed beyond, the last existing key value in the node (in the case of a conventional B-tree) or bucket (in the case of a bounded-disorder index). In those operations, the next key value turns out to be in the next node or bucket, so a further I/O operation must be performed to determine the key value that represents one of the ranges that must be locked if serializability is to be preserved.

According to this other aspect of the invention, however, there is no need for the second I/O operation. Instead of using only values in existing database records as lockable-range boundaries, we use each bucket's key-value limit as the upper bound of the last lockable range in that bucket. In this way, the upper lockable-range boundary of the "next" range that insert and delete operations are required to lock can be determined in the initial index traversal or, if each leaf bucket stores an indication of its key-value limit, found in the bucket itself.

Suppose, for instance, that FIG. 8 depicts the upper end of node 51 and that the key-value limit of that node is a value $k_8$ (not shown) that does not currently exist in the database and would fall in the next node if it did. Further suppose that key value $k_4$ is to be deleted. In the absence of this aspect of the invention, the necessary locking of the next range would require a separate I/O operation to identify the first existing value in the next node's bucket corresponding to the bucket 58 in which value $k_4$ resides. In accordance with the present invention, however, a lockable range is bounded by key value $k_8$, even though $k_8$ is not an existing key value. Since this nodal key-value limit can be obtained during the index traversal, for instance, next-range locking for the deletion of $k_4$ does not require an extra I/O operation.

The manner in which this approach is implemented is not critical. One convenient way is to have the search routine retain the index term that indicates the key-value limit of the node in which the deletion or insertion is to occur. Then, if no existing key value is found in the bucket beyond the position of the insertion or deletion, the operation requests a lock on the range represented by the bucket key-value limit determined from the nodal limit as explained above. Alternatively, the need to extract the node's key-value limit from the traversal of higher-level nodes can be avoided by having each bucket store its key-value limit.

As those skilled in the art will appreciate, the nodes of an index tree are sometimes split to generate new nodes, and are sometimes combined to reduce the number of nodes, as the database contents change. When this happens, the affected nodes' key-value limits change. Since the invention uses key-value limits to define lockable ranges, tree restructuring involves modifying lockable ranges. Use of this aspect of the invention therefore imposes the requirement that locks be acquired before restructuring occurs.

Suppose, for instance, that a node containing key values $k_i$ and $k_{i+1}$ is to be split at a key value $k_{split}$ between $k_i$ and $k_{i+1}$. That is, $k_{split}$ is to become the upper key-value limit $k_{limit}$ of the lower resulting node. Further suppose that the $k_{i+1}$ range has been locked because an uncommitted transaction has extended that range by deleting a key value. Serializability considerations dictate that range $k_{i+1}$ cannot be divided by insertion before the deleting transaction has committed and thus released its lock on the $k_{i+1}$ range. But splitting the node at $k_{split}$ will in fact divide the locked $k_{i+1}$ range, so the node-splitting operation must request a lock on the $k_{i+1}$ range before splitting the node, just as though a record containing $k_{limit}$ were being inserted, if restructuring is to avoid violating the serializability requirement by dividing a range that has resulted from an uncommitted transaction's deletion operation. Locking is similarly required when nodes need to be merged: deletion of $k_{limit}$ of the lower-order node extends the range of the first existing key value $k_1$ of the higher-order node, so the higher-order node's $k_1$ needs to be locked for deletion.

This aspect of the invention therefore introduces a complication, but the resulting concurrency penalty is no worse than that which results from performing an actual insert operation, and it occurs only upon (relatively infrequent) node splits. Clearly, this is a small price to pay for the reduction in access time that is obtained between node splits. Moreover, the concurrency penalties exacted by this locking for node splitting are particularly low if one employs the lock-mode set described in our commonly assigned U.S. patent application for Key-Range Locking Providing Improved Concurrency, filed on even date herewith, which we hereby incorporate by reference. With that lock-mode set, locks intended to lock a key for singleton operations never interfere with node merging or splitting; only scan operations involving the range in which the restructuring is to occur impede that restructuring.

We now turn to certain embellishments that are beneficial in embodiments of the present invention. These concern the overflow buckets, such as bucket 60 of FIG. 6, that one can use in implementing a bounded-disorder index. If the primary bucket into which the hash function directs an insertion is full, the insertion takes place in the overflow bucket. One could treat the overflow bucket substantially as one treats the primary buckets. That is, range locks acquired by operations that end up in the overflow bucket would lock ranges defined by key values in that bucket. This approach has the virtue of algorithmic simplicity. But it presents certain problems when ranges are to be locked and when records in the overflow bucket need to be re-absorbed into a primary bucket because of, say, node splitting or the type of elastic bucket expansion described in the Lomet paper.

The problem that overflow buckets present to range locking is that an overflow bucket will often contain few entries, perhaps none. The lock granularity thus becomes coarse, with the result that, say, a deletion of a single entry from an overflow bucket could require that the node's entire key range be locked.

The problem with record re-absorption is that it involves a deletion and an insertion operation for each record re-absorbed, and each such operation requires range locking just as though it were truly an operation for a new record. The resultant large number of locks may make it difficult or impossible to absorb the records.

At the cost of only a little additional algorithmic complexity, these difficulties can be avoided by treating overflow buckets differently from primary buckets. One way of doing this is to use the overflow buckets in such a way that they can be thought of simply as spaces in which to grow extensions of the primary buckets. FIG. 9 depicts the resulting node organization. In FIG. 9, the ith primary bucket 90 is depicted as containing a sequence of key-value entries $k_1$ through $k_j$, while the overflow bucket segregates its records in accordance with the primary buckets into which they would have landed if there had been room. (Actual physical separation is not necessary; it would suffice, for instance, to include in each overflow-bucket record a tag to indicate the primary bucket into which it would have been placed if there had been room.) FIG. 9 depicts the region of a overflow bucket 92 that contains the overflow from primary bucket 90, among others. FIG. 9 shows that the ordered sequence of records in that region start at key value $k_{j+1}$, where $k_q < k_r$ when $q < r$. That is, key values of all records in the overflow bucket that would have been in primary bucket i if there had been room are greater than all of the key values in the ith primary bucket itself.

For range-locking purposes, one considers the overflow-bucket contents associated with a given primary bucket as part of that primary bucket in the sense that the first key value in the overflow bucket for a given primary bucket becomes the next key for range locking when, for instance, a scan operation reaches the last key value actually stored in the primary bucket. This approach eliminates the key-range coarseness that would otherwise result when the overflow bucket contains a small number of records. Additionally, absorbing overflow records into a primary bucket requires no locking under this approach, since no ranges change in the process.

This approach does add some algorithmic complexity, and it exacts a performance penalty in certain operations. Specifically, consider an insertion operation that is to occur when the primary bucket into which the hashing function initially directs it is full. Such an operation always takes two read operations and a write operation, since the primary bucket needs to be read to determine that it is full and the overflow bucket needs to be read and written because that bucket's contents will be modified as a result of the insertion. This is true regardless of whether the overflow bucket is treated separately, for range-locking purposes, from a primary bucket.

However, if the approach just described is employed, in which an overflow bucket is treated simply as containing extensions of the primary buckets, then the insertion into the primary bucket may have to be performed to keep the proper key-value order between the primary bucket and its extension in the overflow bucket, so a further write operation on the primary bucket will be required as well. Even though the insertion occurs in the primary bucket, the need to write the overflow bucket remains, since it must be updated with the high key value that the insertion forced out of the primary bucket. But inserts that overflow account for less than 10% of all inserts. Since the change in I/O cost for such inserts is 33% under this approach, this approach exacts an additional I/O cost over all inserts of only 3.3%, which is not significant in view of the concurrency increase that it yields.

An alternative approach avoids this I/O cost, albeit at the expense of some concurrency loss. This approach, too, separately stores differently hashed overflow-bucket key values or otherwise associates them with the primary buckets into which they would have been placed if there had been room. But no attempt is made in this approach to maintain key-value order between a primary bucket and the key values associated with it in the overflow bucket: a new key value to be inserted when the primary bucket is full goes into the overflow bucket even if key values exist both above and below it in the primary bucket. Instead, although the overflow-bucket key values are considered in this approach to belong to lockable key-value ranges, the ranges themselves are defined only by the key values in the primary bucket: the overflow-bucket key values do not define those ranges. So when a key value is to be inserted into or deleted from the overflow bucket, the only range that is locked is the one represented by the next-higher key value in the corresponding primary bucket. Identifying that next key value in the primary bucket involves no I/O cost, because the primary bucket will have to have been read already in order to determine that it was full or did not contain the key value to be deleted.

Scanning in this approach differs only in that accessing an overflow-bucket key value requires no separate locking. As the Lomet paper indicates, access to a key value in such scanning of a bounded-disorder file ordinarily requires that a lock be obtained on the range represented by the next-higher key value in the bucket. Since the key values are being accessed in key-value order, the lockable range to which an overflow-bucket key value belongs will always have been locked already.

In short, locking on single-value operations and scans is relatively simple in this approach. Yet the coarse granularity that might otherwise result when the overflow bucket contains few entries is avoided because overflow-bucket key values are not used to define lockable ranges.

Compared with the previous approach, however, this approach is more complex when restructuring necessitates re-absorption of the overflow bucket into the primary buckets. In the previous approach, in which order is maintained between a primary bucket and its overflow-bucket extension, and in which all key values bound lockable ranges, the lockable ranges do not change when the primary buckets absorb the overflow-bucket contents. But this is not true of the alternate approach, and the resulting need to divide lockable ranges could mean that re-absorption would be blocked any time there is a lock on any one of the possibly large number of lockable ranges into which index records from the overflow bucket are to be inserted.

To avoid this difficulty, the initial re-absorption can be performed by placing the erstwhile overflow-bucket values physically into their respective primary buckets without necessarily using them to define lockable ranges right away. For instance, a primary bucket can have an overflow section set aside for key values that have been returned from an overflow bucket but are not yet to be used in defining lockable ranges. Since the values that are placed in this section are not initially used to define lockable key-value ranges, locking does not have to be performed in order to place them into the primary bucket, so the restructuring that necessitates the re-absorption can proceed regardless of the existence of locks. The key values from the overflow section can then be promoted to "full-fledged," lockable-range-defining primary-bucket values whenever it subsequently becomes convenient to do so.

Reflection reveals that this approach does not require the primary bucket to have a physically separate overflow section. Instead, the re-absorbed key values can be located where they would be if they were "full-fledged" key values, but their entries can include flags that identify them as not being among the values to be used in defining lockable ranges.

The present invention thus makes it feasible to obtain the benefits of bounded-disorder indexes in concurrent-transaction databases, and it speeds the locking process for end-of-bucket insertions and deletions. It therefore constitutes a significant advance in the art.

We claim:

1. In a resource-management system for storing data files of data records that include key fields containing respective key values, for maintaining, for respective data files, bounded-disorder key indexes comprising index records organized into trees comprising respective hierarchies of nodes, including leaf nodes divided into respective pluralities of buckets including primary buckets, of leaf-node records containing respective ones of the key values contained in the data records, each primary bucket containing index records that contain key values that a hash function associates with that bucket, for performing insert and delete operations that lock key-valued lockable ranges, associated with respective key values that bound the lockable ranges with which they are associated and into which or from which the insert and delete operations respectively insert or delete values, and for performing scan operations that scan target ranges and lock the key-valued lockable ranges that overlap the target ranges, the improvement wherein a scan operation locks the key-valued lockable range associated with an existing key value in a given bucket if the range extending between that key value and the existing key value in front of it in the same bucket overlaps the scan operation's target range and an insert or delete operation that inserts or deletes in a bucket a key value in front of an existing key value in that bucket locks the key-valued lockable range associated with that existing key value without locking a key-valued lockable range associated with any intervening key value in any other bucket.

2. A resource-management system as defined in claim 1 wherein:
   A) at least one leaf node further includes an overflow bucket that contains at least one index record whose key value the hash function associates with a primary bucket of the same leaf node and with which a lockable range is associated;
   B) the key value of no index record in the overflow bucket falls between key values contained by the primary bucket with which the hash function associates that key value in the overflow bucket;
   C) a scan operation locks a key-valued lockable range associated with one existing key value in the overflow bucket if the range extending between the one existing key value, which the hash function associates with a given primary bucket, and the existing key value that the hash function associates with the same primary bucket and that is contained in front of the one key value in the overflow bucket overlaps the scan operation's target range; and
   D) an insert or delete operation that inserts or deletes in the overflow bucket, in front of an existing key value that is contained in the overflow bucket and is associated by the hash function with a given primary bucket, a key value that the hash function associates with the same primary bucket locks a key-valued lockable range associated with that existing key value without locking a key-valued lockable range associated with any intervening key value that the hash function associates with any other primary bucket.

3. A resource-management system as defined in claim 1 wherein:
   A) at least one leaf node further includes an overflow bucket, which contains at least one index record whose key value the hash function associates with a primary bucket of the same leaf node and which bounds no lockable range;
   B) an insert or delete operation that inserts or deletes in the overflow bucket a key value that the hash function associates with a given primary bucket locks the key-valued range associated with a key value contained in that primary bucket.

4. A resource-management system as defined in claim 1 wherein:
   A) each bucket is associated with a respective bucket key-value range bounded by respective key-value limits;
   B) each leaf-node record contains a respective one of the key values that are contained in the data records and fall within the bucket key-value ranges associated with the bucket that contains that leaf-node record; and
   C) an insert or delete operation directed to the last existing key value in a bucket locks a key-valued lockable range bounded by the key-value limit that bounds the bucket key-value range of that bucket.

5. A resource-management system as defined in claim 4 wherein the resource-management system further includes means for splitting a predecessor bucket into successor buckets by:
   A) locking a key-valued lockable range, bounded by a split key value, in the predecessor bucket; and
   B) subsequently placing into a pair of successor buckets all index records from the predecessor bucket whose key values are respectively less than and greater than the split key value.

6. In a resource-management system for storing data files of data records that include key fields containing respective key values, for accessing the data records in the nonvolatile memory, for maintaining, for respective data files, key indexes comprising index records organized into trees comprising respective hierarchies of nodes, including leaf nodes, stored in the nonvolatile memory, that comprise leaf-node records that the resource-management system accesses in buckets thereof respectively associated with bucket key-value ranges bounded by respective key-value limits, each leaf-node record containing a respective one of the key values that are contained in the data records and fall within the bucket key-value range associated with that leaf-node record's bucket, for performing insert and delete operations that lock key-valued lockable ranges, associated with respective key values that bound the lockable ranges with which they are associated and into which or from which the insert and delete operations respectively insert or delete values, and for performing scan operations that scan target ranges and lock the key-valued lockable ranges that overlap the target ranges, the improvement wherein an insert or delete operation directed to the last existing key value in a bucket locks a key-valued lockable range associated with the key-value limit that bounds the bucket key-value range of that bucket.

7. A resource-management system as defined in claim 6 wherein the indexes are bounded-disorder key indexes, in which each leaf node is divided into a plurality of the buckets including primary buckets, each primary bucket containing index records that contain key values that a hash function associates with that bucket.

8. A resource-management system as defined in claim 7 wherein the resource-management system further includes means for splitting a predecessor bucket into successor buckets by:

A) locking a key-valued lockable range, bounded by a split key value, in the predecessor bucket; and B) subsequently placing into a pair of successor buckets all index records from the predecessor node whose key values are respectively less than and greater than the split key value.

9. A resource-management system as defined in claim 6 wherein the resource-management system further includes means for splitting a predecessor bucket into successor buckets by:

A) locking a key-valued lockable range, associated with a split key value, in the predecessor bucket; and B) placing into a pair of successor buckets all index records from the predecessor node whose key values are respectively less than and greater than the split key value.

* * * * *